March 23, 1943.  R. R. THURSTON  2,314,529
PROCESS OF MAKING ROOFING PRODUCTS
Filed March 1, 1941
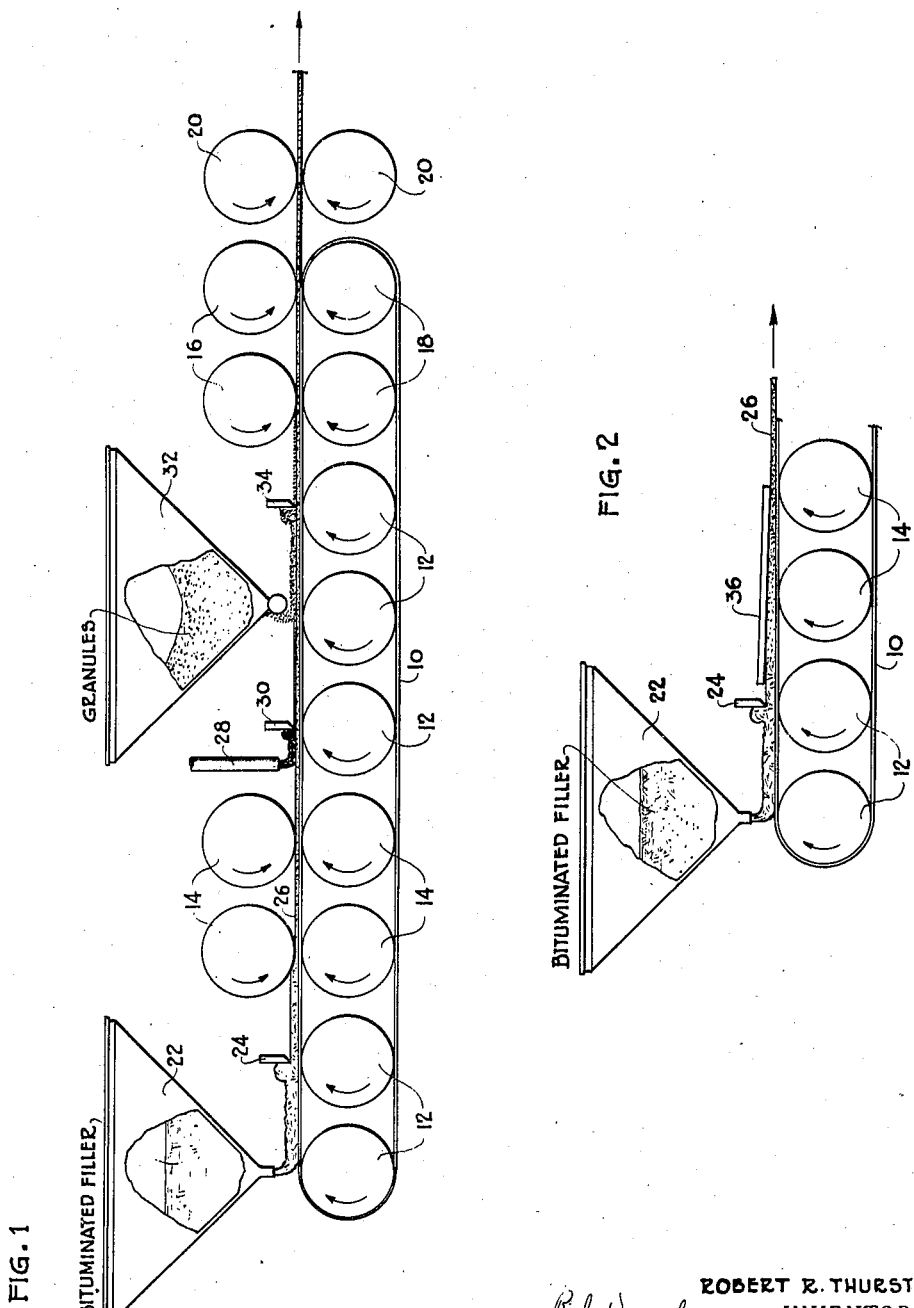
ROBERT R. THURSTON
INVENTOR
BY
ATTORNEYS Patented Mar. 23, 1943

2,314,529

UNITED STATES PATENT OFFICE 2,314,529

PROCESS OF MAKING ROOFING PRODUCTS

Robert R. Thurston, Chappaqua, N. Y., assignor, by mesne assignments, to The Texas Company, New York, N. Y., a corporation of Delaware Application March 1, 1941, Serial No. 381,274

7 Claims. (Cl. 18—48)

This invention relates to a process for making roofing products.

It is an object of the present invention to provide an economical, convenient and continuous process of making such products from dry bituminated filler.

In the drawing:

Fig. 1 is a schematic view in elevation of an apparatus intended for carrying out the process of the present invention, and Fig. 2 is a schematic view in elevation of a modified form of apparatus of the type shown in Fig. 1.

Bituminated filler is a pulverulent mixture of mineral filler and highly dispersed organic binder, which may be produced in the manner described in Letters Patent Re. 20,119, patented September 22, 1936, by Albert Sommer, by combining in a closed chamber a cloud of atomized organic binder such as bitumen and a cloud of highly dispersed pulverulent material which may be of mineral origin in such a manner that the cloud of bituminous material is deposited onto the cloud of pulverulent material so that the particles of pulverulent material are coated with a very thin film of the binding material.

Dry bituminated filler having a bitumen content sufficiently high to produce a workable mastic is particularly suited for the manufacture of roofing products, because of the fact that it can be handled readily while the bitumen content is maintained in an inactive state, and then treated by means of heat, pressure or a solvent to activate or liquefy the bitumen and permit the formation of a mastic sheet of any desired thickness and size.

According to the present invention, bituminated filler is continuously supplied in regulated quantities to an endless conveyor and while on the conveyor the filler is subjected to the action of heated compression rolls which activate the bitumen and cause it and the mineral content to coalesce into a mastic sheet. This mastic sheet can be coated with asphalt if desired and also surfaced with colored granular material. Finally, the desired roofing products can be cut from the sheet to form the particular type of relatively rigid roofing desired, whether it be individual or strip shingles or siding.

The apparatus shown schematically in the drawing includes a continuous or endless conveyor or membrane 10, which is adapted to travel upon and between a plurality of power driven rolls including supporting rolls 12, heated compression rolls 14, embedding rolls 16, cooling rolls 18 and cutting rolls 20. A hopper 22 containing a supply of bituminated filler is positioned above one end of the conveyor 10 and from the hopper the bituminated filler is supplied in regulated quantities to the upper surface of the conveyor 10, which travels to the right, as viewed in the drawing.

The conveyor and the bituminated filler thereon pass beneath a baffle scraper 24, which distributes the filler evenly over the surface of the conveyor and removes any excess. As the conveyor moves on it passes between the compression rolls 14, which may be heated in any suitable manner. The effect of the heat and of the pressure thus applied to the filler on the conveyor 10 is to activate the bitumen content of the filler, which at this point coalesces with the mineral content and forms a mastic sheet 26. Heated asphalt may, if desired, next be applied as a coating to the surface of the mastic sheet and, as shown in the drawing, it may be supplied through a pipe or tube 28. The asphalt so applied as a coating is evenly distributed over the mastic sheet by means of a baffle scraper 30.

In many instances it is desirable to apply colored granules to the surface of the mastic sheet and for this purpose a hopper 32 is disposed above the conveyor and so arranged as to continuously supply regulated quantities of the granules to and across the surface of the sheet, whether it be coated or uncoated. More uniform distribution of the granules over the sheet is obtained by passing the sheet beneath another baffle scraper 34.

After the coating and colored granules have been applied to the mastic sheet, the sheet is passed between the embedding rolls 16 and the cooling rolls 18, the embedding rolls serving to embed the colored granules securely in the surface of the sheet, and the cooling rolls serving to cool the sheet to form a hard mastic. Finally, the sheet 26 is passed between the cutting rolls 20, which are so designed that any desired form of roofing product can be continuously cut from the sheet.

The present invention contemplates the use of alternate types of endless carriers. One type takes the form of a continuous membrane, such as strong wire screening, sheet metal or heavy fabric, which is used only as a conveyor of the bituminated filler. This type is arranged in a conventional manner to travel around the various rolls except the cutting rolls 20, 20. By the time the sheet has passed between the embedding rolls 16, 16 and the cooling rolls 18, 18 it has become sufficiently hard to enable it to pass unsupported to the cutting rolls 20, 20.

The alternate type of conveyor takes the form of an organic member, such as heavy paper, felt or the like, and becomes a part of the finished product, serving as a backing for the mastic sheet and the final roofing products. The action of the heated compression rolls 14 tends to bond the mastic sheet to the material forming the conveyor to provide a unitary structure. When this latter form of carrier is used, the paper or felt is supplied from a roll (not shown) in a well known manner.

In the modified form of apparatus illustrated in Fig. 2, an inclined compression plate 36 is positioned above the carrier, taking the place of the upper compression rolls 14, 14 shown in Fig. 1. The plate 36 is used only when the carrier is of the type first mentioned above; that is, such as wire screening. The arrangement is such that the bituminated filler is progressively compressed between the plate and the carrier as the carrier moves over the lower heated compression rolls 14, 14. When a metallic carrier is employed heat may be applied to it directly from any suitable source. This compression of the bituminated filler, together with the heat supplied directly or from the rolls 14, 14, activates the bitumen content and brings about coalescence of the material. From this point on the remainder of the apparatus and the steps of the process are similar to those described above in connection with the apparatus shown in Fig. 1.

From the foregoing it will be seen that with the apparatus illustrated and described herein it is possible to continuously treat dry bituminated filler in such a manner as to produce as a final product a hard mastic sheet either coated with asphalt or not, or surfaced with granular material or not, as circumstances may require, and the sheet so formed can then be readily and continuously cut into the desired form.

Obviously many modifications and variations of the invention as hereinbefore set forth may be made without departing from the spirit and scope thereof, and therefore only such limitations should be imposed as are indicated in the appended claims.

I claim:

1. A continuous process of manufacturing relatively rigid roofing units which comprises supplying dry bituminated filler consisting of pulverulent material coated with a thin film of bitumen to the surface of an endless conveyor, passing the conveyor between heated compression rolls to activate the bitumen content of the filler and form a mastic sheet, passing said sheet in contact with cooling rolls to harden the mastic and finally cutting said hardened mastic sheet to form the desired roofing units.

2. A continuous process of manufacturing relatively rigid roofing products which comprises supplying dry bituminated filler consisting of pulverulent material coated with a thin film of bitumen to the surface of an endless conveyor, subjecting the filler on the conveyor to heat and pressure to activate the bitumen content of the filler and form a mastic sheet, passing said sheet in contact with cooling rolls to harden the mastic, and finally cutting said hardened mastic into shingles or siding.

3. A continuous process of manufacturing relatively rigid roofing units which comprises supplying dry bituminated filler consisting of pulverulent material coated with a thin film of bitumen to the surface of an endless conveyor, subjecting the filler on the conveyor to heat and pressure to activate the bitumen content of the filler and form a mastic sheet, applying a uniform coating of asphalt to the exposed surface of the mastic sheet, passing said sheet in contact with cooling means to harden the mastic, and cutting the sheet to form roofing units.

4. The process of manufacturing relatively rigid roofing units which comprises continuously supplying dry bituminated filler consisting of pulverulent material coated with a thin film of bitumen to the surface of an endless conveyor, distributing the filler evenly over the surface of the conveyor, subjecting the filler on the conveyor to heat and pressure to activate the bitumen content of the filler and cause it and the mineral content to coalesce and form a mastic sheet, cooling said mastic sheet, and thereafter cutting the sheet to form desired roofing units.

5. A continuous process of manufacturing relatively rigid roofing units which comprises supplying dry bituminated filler consisting of pulverulent material coated with a thin film of bitumen to the surface of an endless conveyor, subjecting the filler on the conveyor to heat and pressure to activate the bitumen content of the filler and form a mastic sheet, applying colored granules to the surface of the asphalt coating, passing the mastic sheet between embedding rolls and cooling rolls to embed the granules in the coating and harden the mastic sheet, and finally passing the sheet between cutting rolls to form roofing units.

6. A process of manufacturing relatively rigid roofing units which comprises continuously supplying dry bituminated filler consisting of pulverulent material coated with a thin film of bitumen to the surface of an endless conveyor, subjecting the filler on the conveyor to heat and pressure to activate the bitumen content of the filler and form a mastic sheet, applying asphalt uniformly to one face of the mastic sheet, applying granular material uniformly to the surface of said asphalt coating, cooling said sheet to harden the mastic, and cutting the sheet to form desired roofing units.

7. A process of manufacturing roofing units which comprises continuously supplying dry bituminated filler to the surface of a continuously moving conveyor of organic material, subjecting the filler and the conveyor to heat and pressure to activate the bitumen content of the filler and form a mastic sheet bonded to the conveyor, cooling said mastic sheet to harden the mastic, and finally cutting said sheet and the attached conveyor to form roofing units backed with the material of which the conveyor is made.

ROBERT R. THURSTON.